United States Patent [19]
Lection et al.

[11] Patent Number: 5,983,003
[45] Date of Patent: Nov. 9, 1999

[54] INTERACTIVE STATION INDICATOR AND USER QUALIFIER FOR VIRTUAL WORLDS

[75] Inventors: David Bruce Lection, Raleigh; Sarah D. Redpath, Cary; David Allen Schell, Durham; Donald Robert Wood, Raleigh, all of N.C.

[73] Assignee: International Business Machines Corp., Armonk, N.Y.

[21] Appl. No.: 08/751,147

[22] Filed: Nov. 15, 1996

[51] Int. Cl.[6] ................................................... G06F 13/00
[52] U.S. Cl. ...................................................... 395/200.32
[58] Field of Search ........... 395/200.32, 200.47–200.49, 395/200.53; 340/825.3–825.35; 434/43; 463/31–34

[56] References Cited

U.S. PATENT DOCUMENTS

| | | | |
|---|---|---|---|
| H1728 | 5/1998 | Kelso et al. | 434/43 |
| 5,559,887 | 9/1996 | Davis et al. | 380/24 |
| 5,675,721 | 10/1997 | Freedman et al. | 395/129 |
| 5,684,951 | 11/1997 | Goldman et al. | 395/188.01 |
| 5,755,620 | 5/1998 | Yamamoto et al. | 463/34 |
| 5,778,183 | 7/1998 | Filion et al. | 395/200.53 |

OTHER PUBLICATIONS

Darrell et al., A Novel Environment for Situated Vision and Behavior, IEEE Comput. Soc. Press, pp. 68–72, Jun. 19, 1996.

*Primary Examiner*—Ellis B. Ramirez
*Assistant Examiner*—William Titcomb
*Attorney, Agent, or Firm*—Gregory M. Doudnikoff

[57] ABSTRACT

A technique for alerting users to the existence of an interactive station within a virtual world accessible via the World Wide Web and determining whether the user is authorized to access the interactive station. An indicator is provided within the virtual world which shows to users the location and existence of an interactive station of the virtual world. The user selects the interactive station indicator in order to attempt to gain access to the interactive station. The virtual world may then verify whether the user is authorized to access the interactive station. Further, if the user is authorized to access the interactive station, the virtual world may maintain access to user data during the user's visit to the interactive station and modify the users data in accordance with the users activities therein. Also, the virtual world may use data provided by the user to perform functions in accordance with the users activities during the user's access to the interactive station.

10 Claims, 6 Drawing Sheets

INTERACTIVE STATION INDICATOR AND USER QUALIFIER FOR VIRTUAL WORLDS

BACKGROUND OF THE INVENTION

1. Field of the Invention

The present invention relates to a technique for indicating to a participant in a virtual world the position of an interactive station and qualifying the participant to interact with the interactive station. More particularly, the present invention relates to a technique for maintaining personal information with an avatar as it interacts within a virtual world.

2. Description of the Related Art

The Internet has existed for a number of years as a means for exchanging information. The first phase in the development of the Internet was the development of a TCP/IP infrastructure which permitted documents and data to be stored on a networked system of computers which permitted access of the documents by users of the Internet. This system was difficult to use, as access was restricted to serious or expert level computer users who could maintain internal cognitive maps of data space.

The next phase of the Internet development was the development of the World Wide Web, which is a hypermedia system which added another layer of abstraction to the existing Internet structure. This abstraction provided an addressing scheme in the form of a unique identifier or universal resource locator (URL). With this system, anyone could tell where to go and how to get there for any document or piece of data within the Web. This permitted use by novice computer users. However, the only form of navigation consisted of direct reference in the form of a URL such as "http:\\www.ibm.com\". In combination with Internet search engines that have been developed for finding URLs for information on the Web, the World Wide Web now provides a retrieval mechanism which compliments the original storage mechanism of the Internet. Still, the system is not entirely user friendly as the user must rely on rigid addressing standards, search engines for finding URLs/ addresses, and links within documents to navigate through the World Wide Web.

The recent explosion in popularity of the Internet can be attributed to a number of factors, the advent of the World Wide Web among them. Another factor has been the decreasing cost of computers and related technologies, and the increases in the speed of communication via high speed modems and the like. This has made possible the graphic-rich portion of the Internet, which is accessed via the World Wide Web. This graphic rich content has given the Internet the mass appeal that it previously lacked.

In the World Wide Web, documents or sites are typically written in the definition language known as Hypertext Markup Language (HTML). Until very recently, the World Wide Web comprised sites which include almost exclusively two dimensional graphics. This was due in part to limitations inherent in HTML. The Internet itself is a large number of computers networked together which contains a large number of sites. Each site has its own unique URL which identifies the computer (server) on the Internet on which the site resides. Typically, a user accesses a site on the Internet from a personal computer via a phone line to an Internet service provider which links the user to the Internet. The user needs Web browser software, such as Netscape Navigator from Netscape Communications Corporation or WebExplorer from International Business Machines Corporation, on his or her computer in order to view most World Wide Web content on the Internet. The Web browser software is able to display the HTML content of World Wide Web sites on the user's monitor.

While it was the advent of two dimensional graphically intense Web sites that spurred the popularity of the Internet, the next level of technology may bring Internets, internal networks such as intranets, and networks in general to a new level. This third phase of Internet development has been the introduction of intranetworks, which are essentially documents and their data (World Wide Web sites) which have been rendered sensually. That is, a user interacts or exists within a site or intranetwork and experiences and perceives the site from within. This new Internet technology involves three dimensional technology which permits simulation of real world objects. The three dimensional technology, also known as virtual reality, permits users to enter three dimensional worlds. Additionally, this three dimensional phase of the Internet permits virtual worlds in which actual people actually participate interactively with each other.

However, this technology is still embryonic. The technology is written in a definition language known as Virtual Reality Modelling Language (VRML). VRML is a language for describing multi-participant interactive simulations in virtual worlds networked via the global Internet and hyperlinked with the World Wide Web. To appropriately view or access a VRML document or site on the World Wide Web, a user is required to have an appropriate VRML viewer or browser in addition to (or in combination with) a Web browser.

As virtual worlds become a reality, virtual worlds will provide a number of advantages over two dimensional documents that will become apparent. Three dimensional worlds hold a promising future in the area of electronic commerce, as users of an electronic store or electronic mall can shop through the store and see and inspect the items that are available. It is also anticipated that virtual worlds will become prevalent in business and social environments as well. Today, virtual worlds lack a number of systems and characteristics that will make them more accepted to the general public. For example, virtual worlds at this time simply do not support many kinds of activities that are available either via standard personal computer systems or in real life interactions with the environments that virtual worlds attempt to mimic.

Three dimensional virtual worlds typically comprise large amounts of data. A virtual world will typically be a web site logically located at a server with participants accessing the virtual world via VRML enabled browsers or clients. The flow of data back and forth is limited by the communications link, such as a user's modem speed, and by network traffic, as well as the speed and ability of a user's computer to process data from the server. Accordingly, this can place a limitation on how virtual a virtual world can really be, and how well a virtual world can mimic the real life scenario it is attempting to exemplify. Depending on the architecture of the server, the virtual world is downloaded to the user's computer, from which the user navigates the virtual world via the local browser or client. The user's participant in the virtual world, which is sometimes referred to as an avatar, typically logically exists on the browser with links back to the server. The user sees via the user's monitor what the avatar sees in the virtual world, and the information regarding the user's avatar is sent back to the server so that the virtual world downloaded to each user can be updated with information about the location and movement of each user's avatar. In this way, each user is kept current with the state of each user's avatar via the user's browser. Also, any user activities which affect the virtual world from more than a local perspective are sent to the server.

Like with HTML-based websites, a need exists for screening users within a virtual world or permitting users of a virtual world with access only to permitted parts of a virtual world. However, as a user is a participant in a multi-user virtual world, existing two dimensional paradigms will not work. Accordingly, given the constraints involved with operating a virtual world over the Internet, a technique needs to be developed which invites participants to interact with elements within a virtual world which intuitively identifies interactive locations and which requires or permits registration and review of the participants in order to prevent unauthorized use, gain information about the participants, collect money from the participants, etc.

SUMMARY OF THE INVENTION

An object of the present invention is to provide a technique for alerting participants in a virtual world about interactive elements or locations within a virtual world.

Another object of the present invention is to require registration with the interactive feature of the virtual world before permitting the participant to interact with the feature.

Yet another object of the present invention is to provide a system for permitting the screening of each participant within an interactive world before permitting each participant to utilize certain functions within the virtual world.

Other objects and advantages of the present invention will be set forth in part in the description and the drawings which follow, and, in part, will be obvious from the description or may be learned by practice of the invention.

To achieve the foregoing objects, and in accordance with the purpose of the invention as broadly described herein, the present invention provides a computer implementable technique, system and method for use in a three dimensional virtual world for indicating to a particpant in the virtual world a location from which an activity or component or interactive station of the virtual world may be accessed, for automatically receiving data from the user upon an attempt to access, and permitting access by the user if the user is authorized to access the component, activity or interactive station based on the received data.

The present invention will now be described with reference to the following drawings, in which like reference numbers denote the same element throughout.

DESCRIPTION OF THE PREFERRED EMBODIMENT

Figure 1:
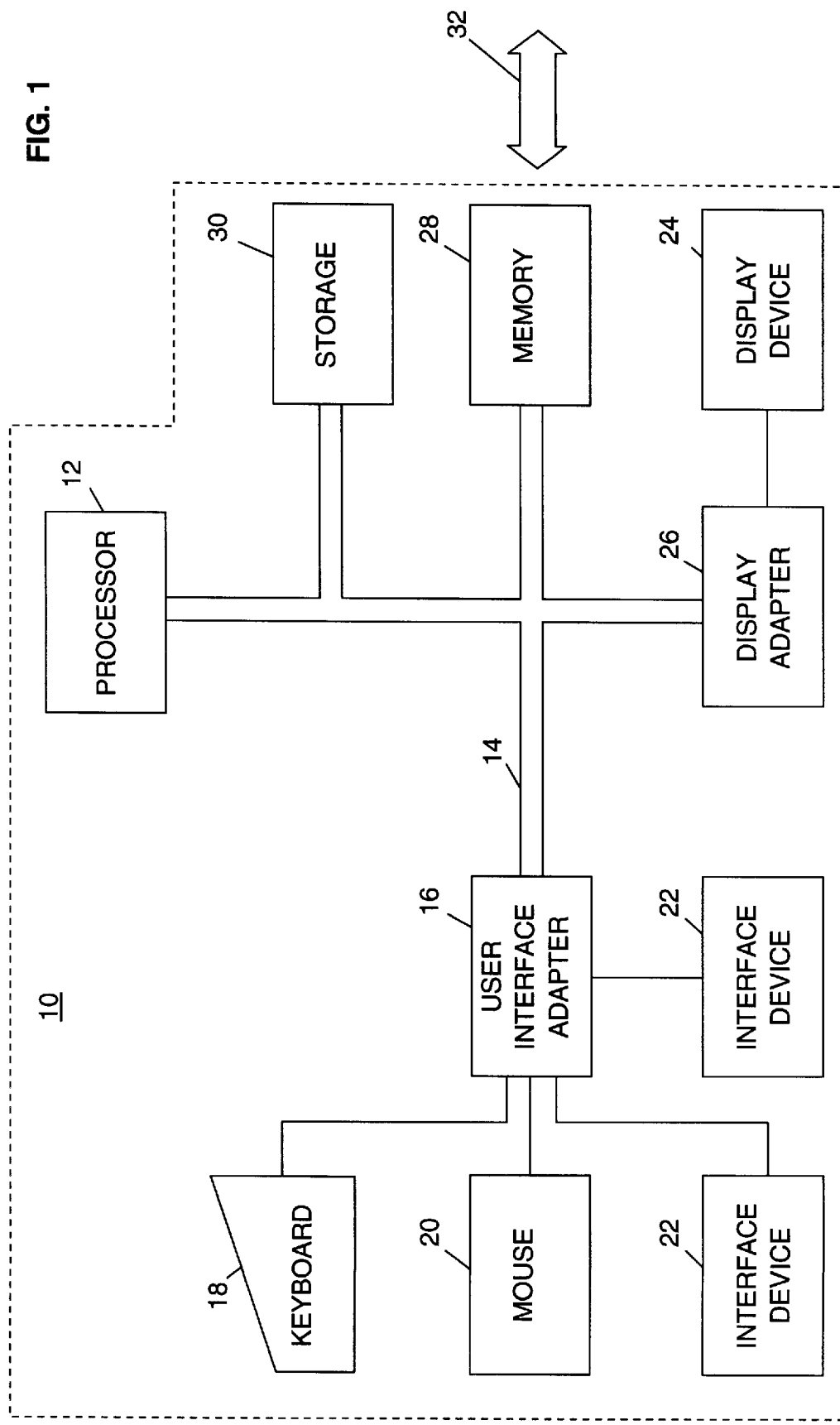
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and permanent storage 30 which can include a hard drive, tape drive, etc.

The workstation 10 communicates via a communications channel 32 with other computers or networks of computers. The workstation 10 may be associated with such other computers in a local area network (LAN) or a wide are network, or the workstation 10 can be client in a client/server arrangement with another computer, etc. All of these configurations, as well as the appropriate communications hardware and software, are known in the art.

Figure 2:
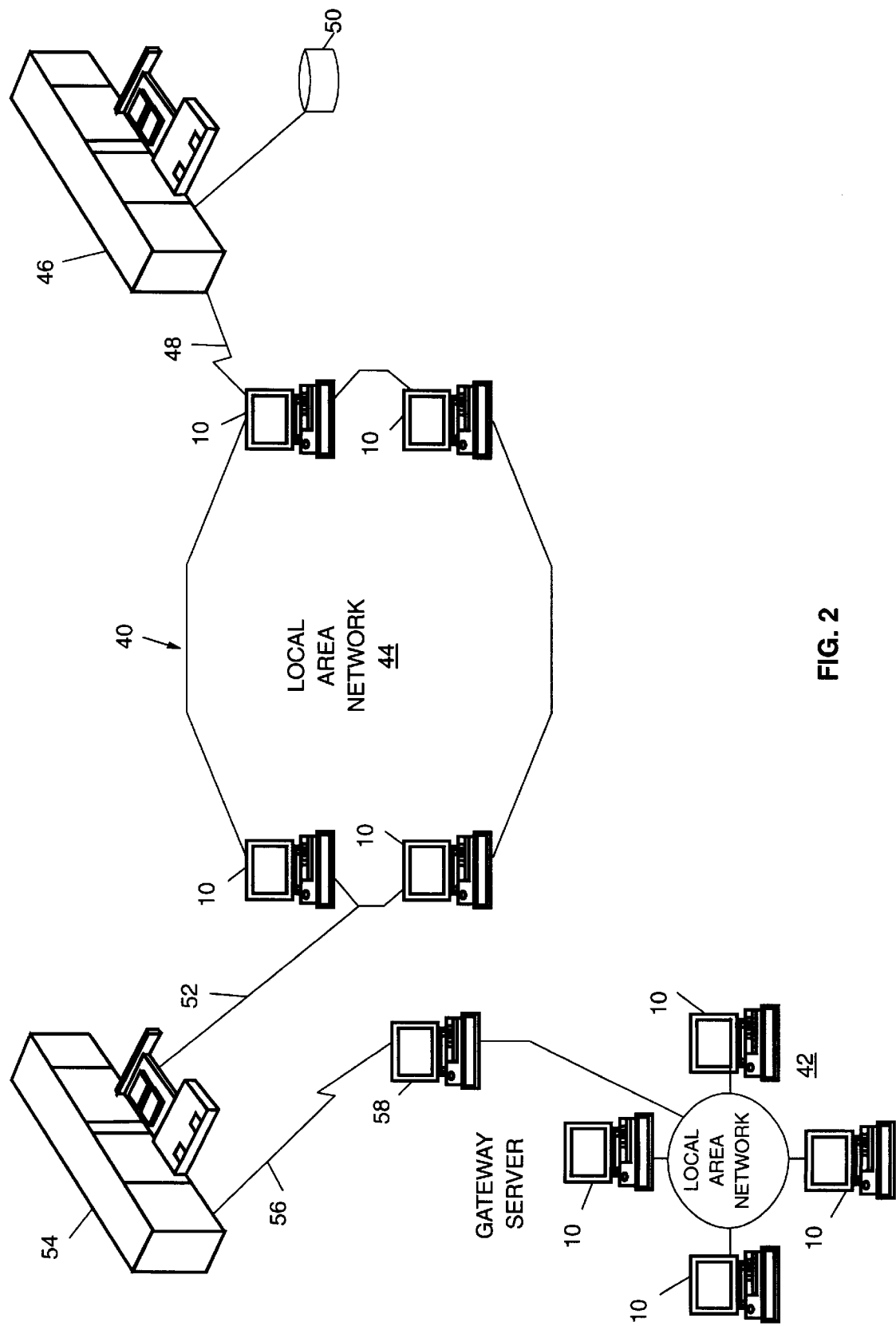
FIG. 2 is a diagram of a networked computing environment in which the present invention may be practiced.

FIG. 2 illustrates a data processing network 40 in which the present invention may be practiced. The data processing network 40 may be the Internet, Intranet or the like, and includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" and "Enterprise Systems Architecture/390" are trademarks of IBM; "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 5. In the preferred embodiment, a virtual world is implemented in the VRML language and is logically situated as a site or document resident on a server which is accessible via the World Wide Web. When a user participates in an intranetworked virtual world on the World Wide Web, the logical relationship between the user's browser (the client) and the server depends on the architecture of the server. Most commonly, the browser downloads the virtual world from the server. In a multiuser virtual world, the users are represented in the virtual world by representatives under their control, which are sometimes referred to as avatars. Each user's avatar logically exists within the browser and navigates through the downloaded virtual world. The user views the virtual world from his or her computer which is linked to the World Wide Web via a VRML enabled browser from the viewpoint of the user's avatar. Information regarding the user's avatar and its movements and actions within the virtual world are uploaded to the server. The server updates the downloaded virtual worlds for each user in the multiuser environment with information regarding the existence, appearance and movement of the avatars of each participant in the multiuser virtual world.

For the most part, objects in a multiuser virtual world are VRML defined objects with which users or participants, via their avatars, may interact or view while visiting the virtual world. Techniques for creating virtual worlds, VRML objects and basic avatars are known in the art and will not be discussed herein. VRML is a definition language for defining three dimensional objects for use in a three dimensional virtual world. A participant in a virtual world who "walks" around a VRML object essentially sees the object in three dimensions, and views the object from different perspectives during the walk. Logic for causing action or providing function within a virtual world can be written to a limited extent in VRML. For more significant logic, VRMLScript or JavaScript are often used scripting languages, and the Java language itself can be utilized. From the description which follows, a skilled programmer could implement the present invention using VRML or a combination of VRML and one or more of the languages for implementing the logic.

Figure 3:
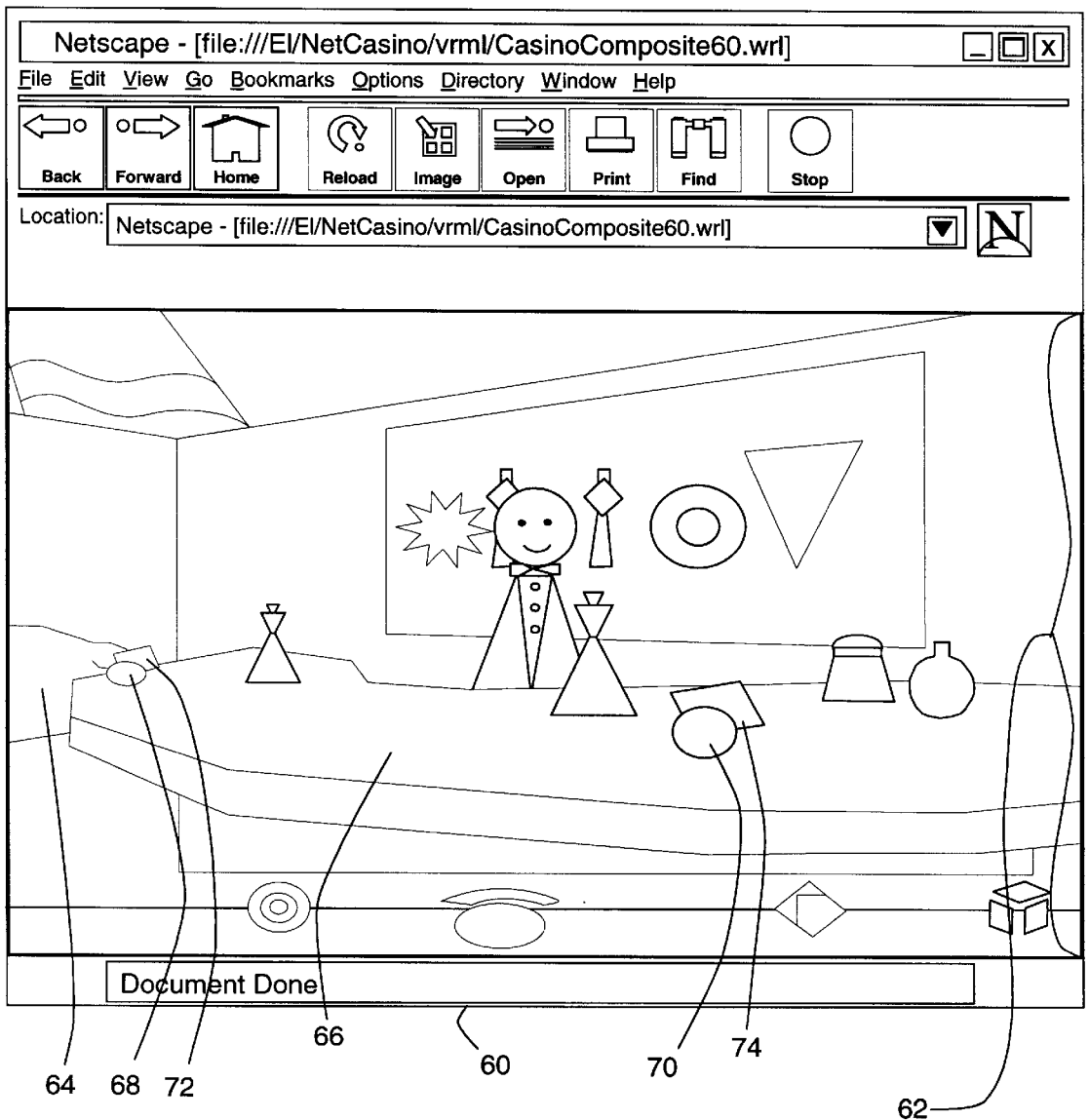
FIG. 3 illustrates a window for a browser showing an interactive station in a virtual world before a user has attempted access.

FIG. 3 illustrates a window 60 for a browser as displayed on the user's monitor or the like. The window 60 includes a portion 62 which displays a view onto a virtual world 64. The view is provided from the viewpoint of the user's avatar within the virtual world 64. The portion of the virtual world 64 displayed in FIG. 3 includes an interactive station within the virtual world in the form of a virtual bar 66 at which the user may puchase virtual drinks. As virtual worlds can be quite large and difficult for a user to navigate through and determine what portions are interactive, the virtual bar 66 includes a pair of interactive station indicators 68,70. Interactive station indicators can take on any of a variety of forms. In the preferred embodiment, they are presented as half spheres which are placed upon the surface of the virtual bar 66. In order to draw a user's attention as the user navigates through the virtual world 64, the indicators 68,70 periodically light up and then return to a normal unlit state. Preferably, the lighting up of the indicators 68,70 does not affect any other element of the virtual world 64. By drawing attention to the virtual bar 66 in this manner, a minimum of user's computer processing time is required, as it is a relatively simple thing in VRML to periodically change the lighting properties for an object.

In addition to drawing attention to the interactive station of a virtual world, it is preferred that the indicators also act as a user authentication or verification station through which a user gains access to the interactive station. In the preferred embodiment, to attempt to gain access to the interactive virtual bar 66, the user would place the computer's mouse cursor over one of the indicators 68,70 and click an appropriate mouse button. Alternatively, the user can cause his or her avatar to physically touch one of the indicators 68,70. Any number of other variations are also possible.

According to the preferred embodiment, each of the interactive station indicators 68,70 also comprises virtual card reader 72,74, respectively. These card readers 72,74 are intended to intuitively communicate to the user that the exchange or potential exchange of some kind of data contained on a card object is required in order to interact with the interactive virtual bar 66. The user can obtain a virtual card object for inserting into the card readers 72,74 in any of a number of ways, as defined by the rules and requirements of the virtual world. For example, the user may be required to register with the virtual world upon entry thereto, and be provided with a virtual card having certain data thereafter. Alternatively, a user may already have a virtual card when the user arrives in the virtual world which contains the identify of the user and/or a password which permits access to the interactive station. It should be noted that the interactive station can be any number of things. For example, an authorized user may be permitted access to an otherwise restricted portion of the virtual world in which a virtual business meeting is being held using the Internet for voice communication but also permitting the various participants to input graphics or video for the meeting. The virtual password may permit a user to access otherwise restricted data or information. The user's card could also include a debit function or a credit card function which would permit the user access to a pay per view portion of the virtual world, or to go shopping in a virtual mall.

In the example described herein, the user's card serves both to indicate that the user is registered with the virtual world and that the user has established a line of credit in the virtual world. As illustrated in FIG. 4, a user's virtual card 76 has been placed by the user following the touching of the interactive station indicator 70 by the user in the virtual card reader 74. The amount of credit on the virtual card 76 is displayed to the user within the portion 62 of the browser. When the user selects a virtual flask 78, a bartender object 80 serves the user a virtual drink 82. The cost of the virtual drink 82 is debited from the user's virtual card 76, and the new credit amount is then displayed to the user. To implement and/or store these changes and events, information is exchanged between the local browser and Web server in accordance with known techniques.

By then selecting or touching the interactive station indicator 70 again, the user retrieves his or her virtual card 76 from the card reader 74, and the user's interaction with the virtual bar 66 ends. The interactive station indicator 70 then begins flashing again to indicate that it is selectable and represents an interactive station.

Figure 5A:
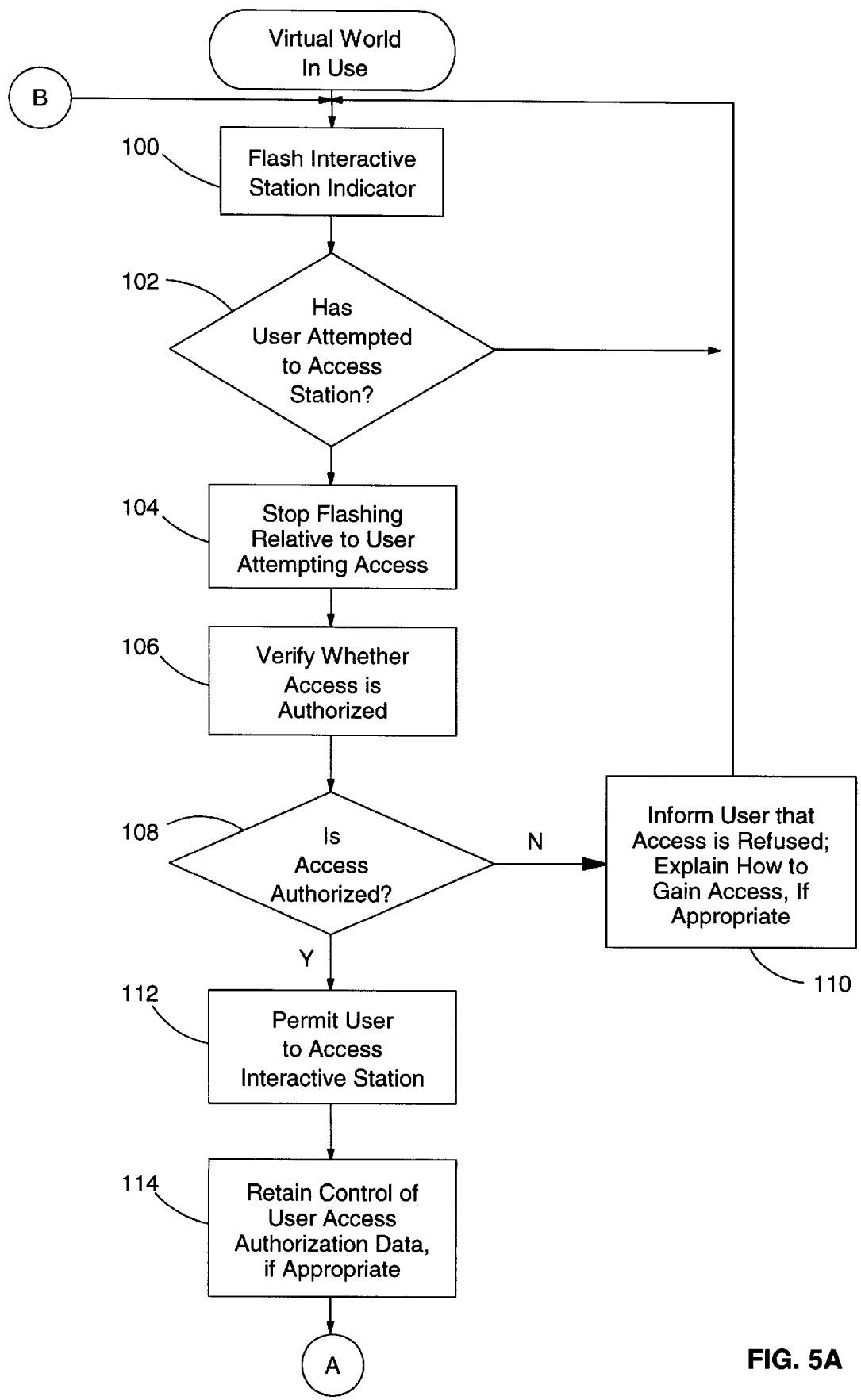
FIGS. 5A–5B show a flowchart illustrating the logical steps involved with a user interacting with an interactive station according to the present invention.
Figure 5B:
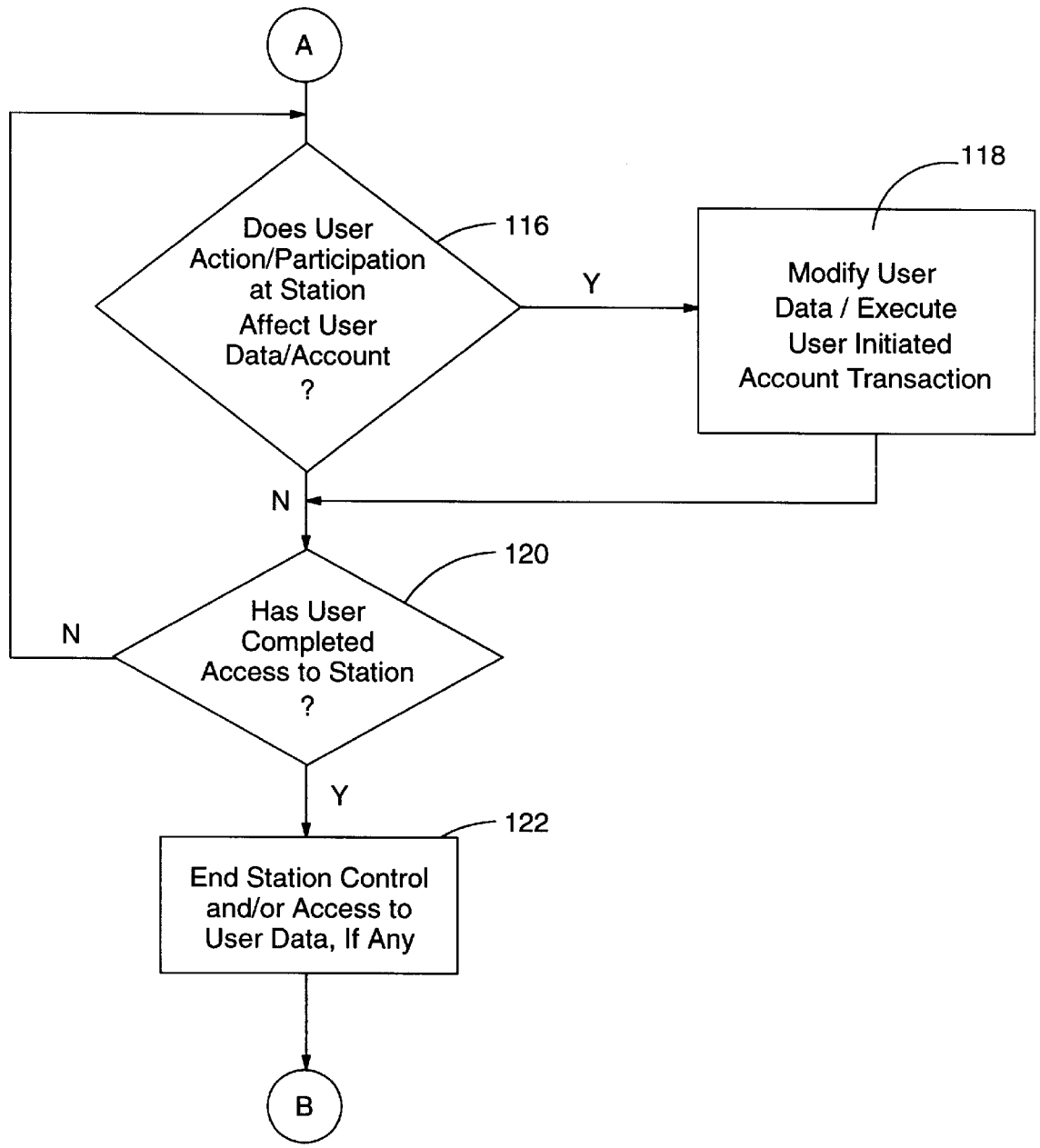

The logical steps involved with utilizing the present invention will now be described with reference to the flowchart of FIGS. 5A–5B. When the virtual world is in use, and the user has within his or her view one of the interactive station indicators, the station indicators flash on and off at a predetermined time interval (in the preferred embodiment) so as to catch the attention of the user. The flashing may comprise changing the relative lighting intensity of the indicators, or changing their color. Other techniques to gain a user's attention can be utilized as well, such as other visual effects and/or sound. The user may then navigate within the virtual world to become proximate to one of the interactive station indicators utilizing known navigation controls. Alternatively, the user from a distance may select one of the flashing interactive station indicators, upon which the virtual world takes over the control of the motion of the user and brings the user from the user's previous location within the virtual world to the interactive station. When the user selects the interactive station indicator, the virtual world considers the selection to be an attempt to access the interactive station (Step 102), and the flashing of the interactive station indicator relative to the selecting user is stopped (Step 104). Depending on the virtual world, the virtual world may be a multiparticipant virtual world in which only one user can select a particular interactive station at a time. Alternatively, an interactive station can entertain multiple users simultaneously, which would be preferred if commerce is the essence of the virtual world. Users interacting with a given interactive station may or may not be visible to each other. If the interactive station is available for only one user at a time, the flashing of the indicator would cease relative to all of the users. If not, the flashing would continue until a maximum number of users which may be entertained is reached, if any.

The interactive station treats the selection of the interactive indicator as an attempt to access the interactive station. As per Step 106, the virtual world, either locally or through the server, then determines whether the user is authorized to access the interactive station. Authorization may be based on any of a variety of criteria. For example, authorization may be based on the user first registering with the virtual world when the user enters the virtual world. The user would then be given VRML data, which may be associated with a virtual card. In the case where a virtual card is employed, the virtual card is held by the card reader of the interactive station indicator while verification is carried out. The virtual world server may have been attempting, following registration of the user upon entry to the virtual world, to determine if data provided by the user to the virtual world is legitimate. The user could then be denied access if the supplied information proves to be bogus or verification is not completed during the time that the user has been in the virtual world and navigating to the interactive work station. Alternatively still, access may be authorized if the user is using a virtual card which has a valid authorization password on it or the virtual card includes a debit feature which the virtual world server can debit and credit to its own account dependent upon the user's actions at the interactive station.

In any case, if it is determined in Step 108 that the access attempt is not authorized, processing proceeds to Step 110, in which the user may be informed why access was denied and provided with information as to how to gain access. The user's card is returned to the user (the data is released by the interactive station), and processing is returned to Step 100 and the interactive station indicator once again begins flashing.

On the other hand, if it is determined in Step 108 that the user's access attempt is authorized, processing proceeds to Step 112, and the features of the interactive station are made available for use by the user. The virtual world server via the interactive station may retain control of the user's virtual card or user data that was provided to the virtual world by the card or otherwise by the user. Based upon the user's interaction with the interactive station, a debit feature of the virtual card may be utilized, with the card being debited or credited, depending upon the user's activites at the interactive station, by the virtual world server. A user's real life credit card can be used to make purchases at the interactive station, etc. (Step 114). If it is determined in Step 116 that the user's action at the interactive station affects user information included on the virtual card, the virtual world server causes that information to be modified or adds new information to the virtual card. In the example illustrated in FIGS. 3 and 4, the user buys a virtual drink and the user's monetary card balance is debited. In other situations, a debit feature of the virtual card may be utiized based on the amount of time that the user spends at the interactive station, or the interactive station may be a virtual mall at which the user is making real life purchases. The purchased product is sent to the user, and the user's virtual card is debited or credit card information provided on the card is utilized to make an actual charge to the user's credit card account. Alternatively, the virtual card may contain information which includes a password to permit the user to have access to certain information or another portion of the virtual world. In such cases, the data on the virtual card may not be modified at all, other than possibly to add information regarding that the user attended a meeting for a certain period of time or to provide the logical location of this interactive station so that the user may take this information when the user leaves the virtual world for future reference (Step 118).

Figure 4:
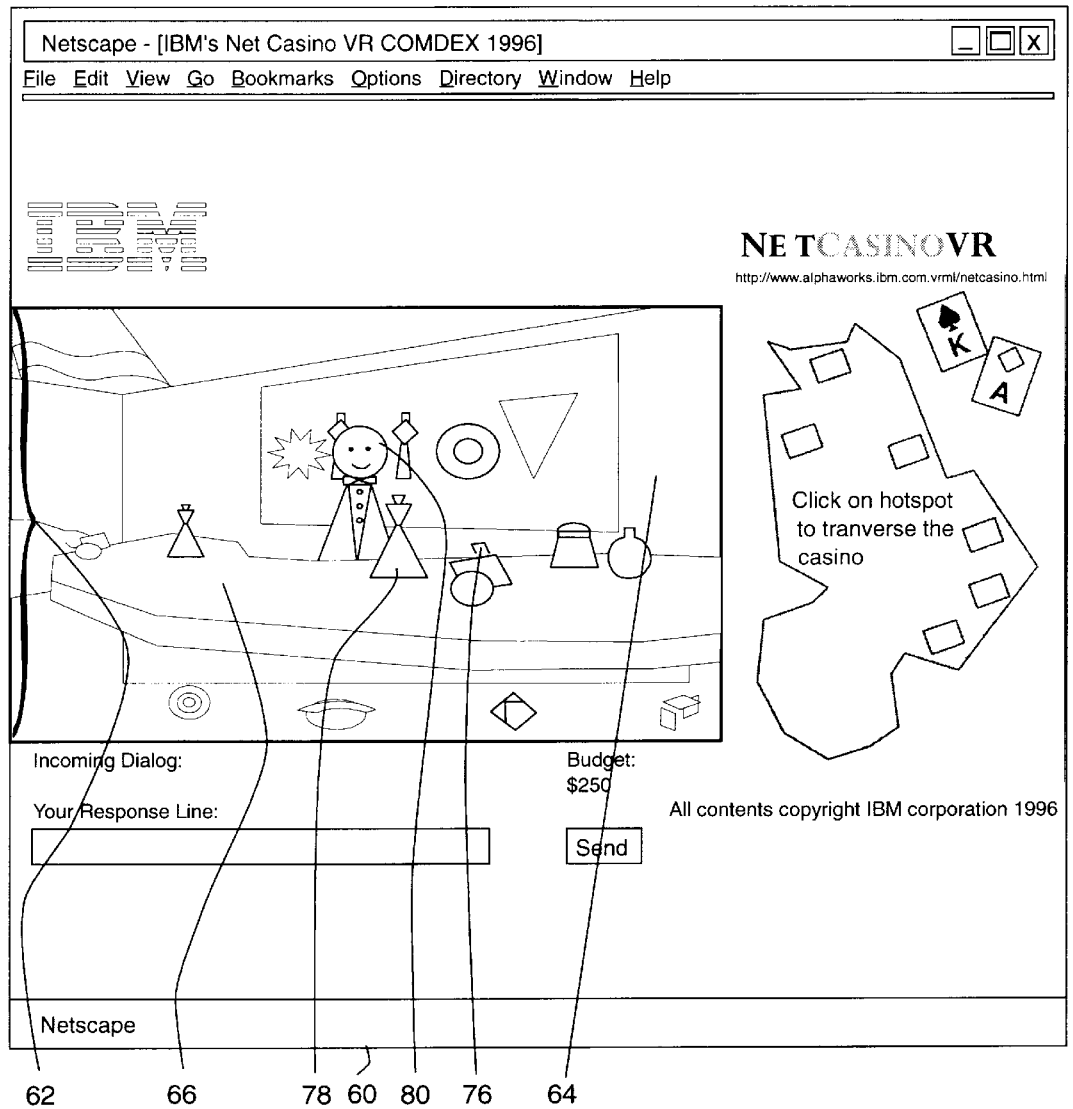
FIG. 4 illustrates a window for a browser showing an interactive station in a virtual world after the user has been granted access.

In the example illustrated in FIGS. 3 and 4, when the user once again selects or touches the interactive station indicator 70 which contains the user's virtual card 76, the virtual card is returned to the user. When this is determined to have occurred in Step 120, user access to the interactive station is ended and the virtual world's access to the user's data may also be ended (Step 122). Processing then returns again to step 100, and the interactive station indicator 70 once again starts flashing.

It should be understood that the interactive station indicator can be any number of items which draws the user's attention, and the mechanism selected for the user to end his or her participation in the interactive station may not be the interactive station indicator which the user utilized to gain access to the interactive station. Further, while a virtual card metaphor has been used in the above example, it is not necessarily the only means by which user information can be carried and authorization for access obtained to an interactive station within a virtual world.

While the preferred embodiment of the present invention has been described, additional variations and modifications in that embodiment may occur to those skilled in the art once they learn of the basic inventive concepts. Therefore, it is intended that the appended claim shall be construed to include both the preferred embodiment and all such variations and such modifications as fall within the spirit and scope of the invention.

We claim:

1. Computer readable code on media for indicating to users the location of an interactive station within a World Wide Web based virtual world and verifying whether the users are authorized to use the interactive station, comprising:

first subprocesses for providing an interactive station indicator associated with an interactive station which signals to at least one user a location in the virtual world from which the user may initiate interaction with the associated interactive station;

second subprocesses for permitting the user to attempt access of the interactive station by interacting with the interactive station indicator; and third subprocesses for verifying whether the user is authorized to access the associated interactive station depending upon user data and permitting access if the user is authorized.

2. Computer readable code according to claim 1, wherein the interactive station indicator signals to users by periodically changing its lighting intensity.

3. Computer readable code according to claim 1, further comprising:

fourth subprocesses for modifying the user data depending upon activities of the user at the interactive station.

4. Computer readable code according to claim 1, wherein said third subprocesses further comprises maintaining access to the user data while the user interacts with the interactive station.

5. Computer readable code according to claim 1, further comprising fifth subprocesses for ending user access to the interactive station when the user again interacts with the interactive station indicator.

6. Computer readable code according to claim 5, wherein said fifth subprocesses further comprises ending access to the user data relative to services provided by the interactive station when user's access to the interactive station ends.

7. Computer readable code according to claim 1, wherein the user data is maintained on a card object, wherein said second subprocesses further comprises the user giving the card object to the interactive station indicator, and wherein said third subprocesses comprises further determining whether the user is authorized to access the interactive station based on the user data maintained on the card object.

8. In a computing environment, a system for use in a three dimensional virtual world accessible to a user via a World Wide Web site for indicating to the user while participating in the virtual world a location at which an activity or component of the virtual world may be accessed and verifying whether the user is authorized to access the activity or component, comprising:

means for visually indicating to a user a location at which the user may initiate access to an activity or component in a multi-user three dimensional virtual world residing at a World Wide Web site may be accessed;

means for determining whether the user has attempted to access the activity or component via said indicating means;

means for verifying whether the user is authorized to access the activity or component based on user data; and means for permitting the user to access the activity or component if the user is authorized.

9. A method for use in a computing environment for indicating to participants in a three dimensional virtual world locations at which virtual world activities may be accessed by the participants, comprising the steps of:

providing visual indicators to participants in a multi-user three dimensional virtual world residing at a website on the World Wide Web which indicate locations at which activities associated with the visual indicators may be accessed;

determining whether a first participant has attempted to access one of the activities via its associated visual indicator;

verifying whether the one of the participants is authorized to access the activity based on user data associated with the first participant;

permitting the first participant to access the activity if the first participant is found to be authorized, and maintaining access to the user data while the user interacts with the activity; and modifying the user data depending upon actions of the first participant at the activity.

10. The method according to claim 9, wherein the user data is maintained on a card object associated with the first participant, wherein the virtual world does not have access to the user data on the card object unless the first participant attempts to access one of the activities.

* * * * *